(No Model.)
J. F. PIERCE.
DRIP COFFEE POT.
No. 578,769. Patented Mar. 16, 1897.
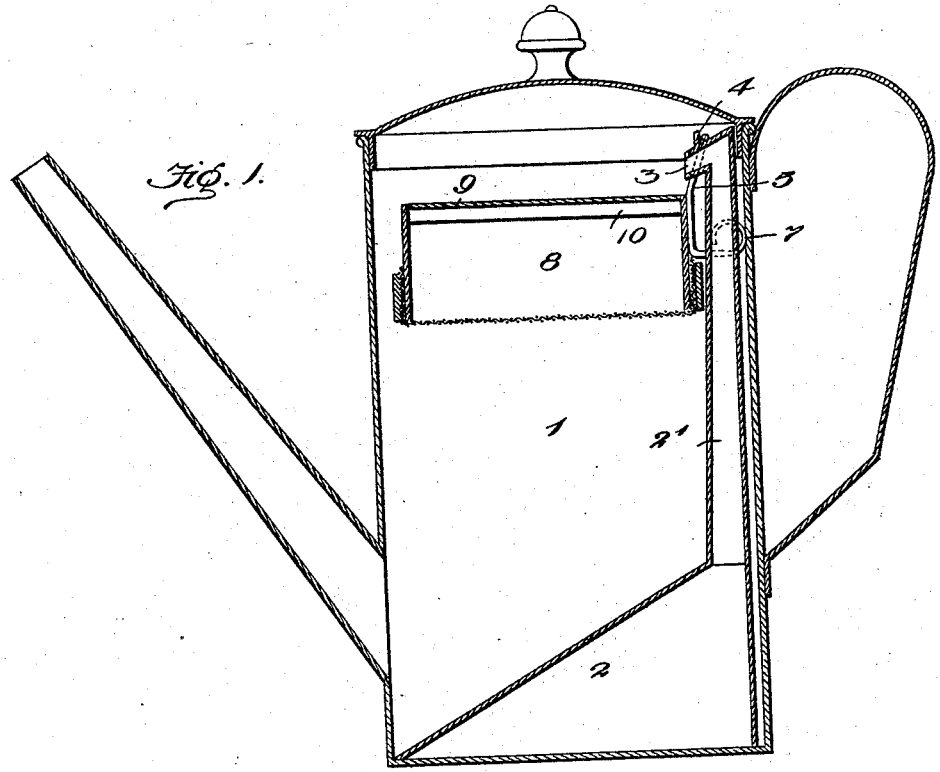
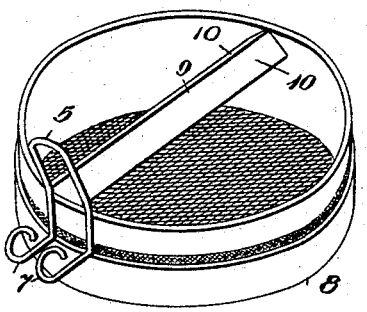
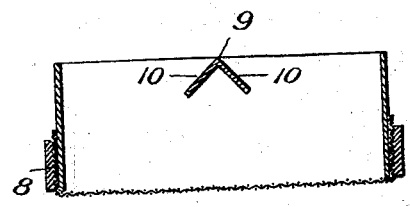
Witnesses
Inventor
John F. Pierce.
By H. B. Willson.
Attorney

UNITED STATES PATENT OFFICE.

JOHN F. PIERCE, OF ELIZABETHTON, TENNESSEE.

DRIP-COFFEE POT.

SPECIFICATION forming part of Letters Patent No. 578,769, dated March 16, 1897.

Application filed December 29, 1896. Serial No. 617,368. (No model.)

*To all whom it may concern:*

Be it known that I, JOHN F. PIERCE, a citizen of the United States, residing at Elizabethton, in the county of Carter and State of Tennessee, have invented certain new and useful Improvements in Drip-Coffee Pots; and I do declare the following to be a full, clear, and exact description of the invention, such as will enable others skilled in the art to which it appertains to make and use the same.

My invention has relation to improvements in drip-coffee pots; and the object is to provide a simple and convenient utensil of this class for household use.

To this end the novelty consists in the construction, combination, and arrangement of the same, as will be hereinafter more fully described, and particularly pointed out in the claim.

In the accompanying drawings the same reference-characters indicate the same parts of the invention.

Figure 1 is a vertical section of my improved drip-coffee pot. Fig. 2 is a perspective view of the percolator removed from the pot. Fig. 3 is a transverse vertical section of the same.

1 represents the ordinary pot, which may be of any suitable size and shape.

2 represents the removable steam-hood provided with an integral vertical tubular standard 2', terminating in a deflecting nozzle or spout 3, all of which are of the usual construction. This spout 3 is provided with a retaining-lug 4, which engages the upper end of the yoke 5, fixed on the percolator-frame 6, the horizontal arms 7 7 of which project outwardly and rest against the contiguous wall of the pot to support the percolator 8 in a horizontal position in the upper end of said pot.

9 represents a transverse A-shaped brace secured in the percolator 8 immediately below the spout 3, onto which the boiling water falls and is distributed evenly over the contents of the percolator by means of the sides 10 10, which forms a distributer for the boiling water and also a handle for manipulating the percolator.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new and useful, and desire to secure by Letters Patent of the United States, is—

A drip-coffee pot, comprising the hood 2, provided with the integral tubular standard 2' and spout 3 having the retaining-lug 4, in combination with the percolator 8, provided with the fixed yoke 5, having the integral horizontal arms 7 7, substantially as shown and described.

In testimony whereof I hereunto affix my signature in presence of two witnesses.

JOHN F. PIERCE.

Witnesses:
C. G. BEASLEY,
A. E. SIMERLY.